(12) United States Patent
Zhou (10) Patent No.: US 12,465,993 B2
(45) Date of Patent: Nov. 11, 2025

(54) SENSOR FUSION FOR WELDING QUALITY MONITORING

(71) Applicant: Hitachi, Ltd., Tokyo (JP)

(72) Inventor: Quan Zhou, West Bloomfield, MI (US)

(73) Assignee: Hitachi, Ltd., Tokyo (JP)

( * ) Notice: Subject to any disclaimer, the term of this patent is extended or adjusted under 35 U.S.C. 154(b) by 410 days.

(21) Appl. No.: 18/152,587

(22) Filed: Jan. 10, 2023

(65) Prior Publication Data

US 2024/0227052 A1 Jul. 11, 2024

(51) Int. Cl.
*B23K 9/095* (2006.01)
*B23K 31/12* (2006.01)
*G05B 19/4155* (2006.01)
*G06N 20/00* (2019.01)

(52) U.S. Cl.
CPC .......... *B23K 9/0953* (2013.01); *B23K 31/125* (2013.01); *G05B 19/4155* (2013.01); *G06N 20/00* (2019.01); *G05B 2219/45104* (2013.01)

(58) Field of Classification Search
None
See application file for complete search history.

(56) References Cited

U.S. PATENT DOCUMENTS

2023/0274407 A1* 8/2023 Kommareddy ...... B23K 31/125
382/141

* cited by examiner

*Primary Examiner* — Sean Shechtman
(74) *Attorney, Agent, or Firm* — PROCOPIO, CORY, HARGREAVES & SAVITCH LLP (57) ABSTRACT

Systems and methods described herein involve intaking sensor data associated with an arc weld from a robotic welding process, the sensor data involving thermal imaging data; executing a machine learning model on the sensor data, the machine learning model configured to output predicted internal parameters of a weld seam of the arc weld, predicted surface parameters of the weld seam of the arc weld, and a predicted quality of the arc weld associated with the predicted internal parameters and the predicted surface parameters; and modifying parameters of the robotic welding process of the arc weld based on the output predicted quality, the output predicted internal parameters, and the predicted surface parameters.

20 Claims, 6 Drawing Sheets

SENSOR FUSION FOR WELDING QUALITY MONITORING

BACKGROUND

Field

The present disclosure is generally directed to welding systems, and more specifically to systems and methods involving sensor fusion for welding quality monitoring.

Related Art

Welding is a major manufacturing process that joins two or more pieces of materials together through heating/mixing them followed by cooling/solidification. The goal of welding manufacturing is to join materials together to meet service requirements at lowest costs. Welding technology has gained access virtually to every industry from manufacturing to fabrication. There are various types of welding including arc welding, friction stir welding, gas welding, energy beam welding, and solid-state welding.

Each of these have other subtypes and use different methods to achieve a joint. Among all, arc welding is one of the simplest, oldest, and most adaptable types of welding which is widely used in industries today. In arc welding process, electricity is applied to create an arc between electrode and the conductive base metals. The arc has sufficient energy to melt the base material and (in some processes) the electrode into a liquid state, known as the weld pool. This pool constructs the joints between molten materials, and once cooled forms welds of a required strength and quality.

The quality of a weld is critical since in many cases, such as aerospace or construction, it can directly influence safety and the longevity of the product. For manufacturers, real-time sensing and quality judgement during the welding process is desired, because off-line quality inspection and/or additional inspection process typically adds much more time and labor needed for production. Furthermore, the added inspection typically requires destructive testing, which means 1) inspection cannot be performed on all products to ensure quality; 2) added lead time due to time-consuming testing; and 3) latency between problem discovery and mitigation to generate additional waste.

SUMMARY

There is a need for real-time, in-process quality inspection that does not add cycle time to production, and provide on-the-fly information about problems with associated quality for immediate countermeasures.

Traditionally, welding quality inspection is typically performed after the actual welding process and carried out in a destructive manner, meaning that the welded parts needs to be cut open to reveal the internal structure for closer examination. There are non-destructive inspection methods like ultrasonic testing, but they are also off-line testing and requires time for setting up and are difficult to perform on all parts due to time and labor.

Newer technologies do exist for real-time welding monitoring, but are more focused on process monitoring, such as processing parameters during welding like the weld gap size, welding seam geometry, travelling speed, and so on. There has been a lack of development contributed to the quality aspects of arc welding. Process monitoring can help provide information to make the best effort for a good weld, while the final welding quality is still not confirmed.

The proposed new method can achieve real-time, in-process quality judgement using non-destructive thermal imaging-based sensor data, along with other process data collected during the welding process. By utilizing advanced data analytics with artificial intelligence (AI) and machine learning (ML), digitized welding quality information can be generated during the welding process, allowing quick inspection even before the entire welding process is finished.

The AI/ML based quality prediction model establishes the relationship between various sensor data collected during welding and the corresponding final welding quality data. First, numerous repetitive welding trials needs to be performed to collect both the in-process welding data and also the final digitized welding quality information; Then, both datasets (welding process & final welding quality) will be fed into the model to "learn" the relationship between them; Finally, once a reliable connection between process data and quality data is established, the model use this relationship to predict/judge welding quality using real-time welding process data as an input. Additionally, the model can be further improved with more and more correlated welding process and quality datasets, providing opportunities for further improvement and adaption for special operations.

Aspects of the present disclosure can involve a method, which can include intaking sensor data associated with an arc weld from a robotic welding process, the sensor data having thermal imaging data; executing a machine learning model on the sensor data, the machine learning model configured to output predicted internal parameters of a weld seam of the arc weld, predicted surface parameters of the weld seam of the arc weld, and a predicted quality of the arc weld associated with the predicted internal parameters and the surface parameters; and modifying parameters of the robotic welding process based on the output predicted quality, the output predicted internal parameters, and the predicted surface parameters of the arc weld.

Aspects of the present disclosure can involve a computer program, which can include computer instructions involving intaking sensor data associated with an arc weld from a robotic welding process, the sensor data having thermal imaging data; executing a machine learning model on the sensor data, the machine learning model configured to output predicted internal parameters of a weld seam of the arc weld, predicted surface parameters of the weld seam of the arc weld, and a predicted quality of the arc weld associated with the predicted internal parameters and the surface parameters; and modifying parameters of the robotic welding process based on the output predicted quality, the output predicted internal parameters, and the predicted surface parameters of the arc weld. The computer program and instructions can be stored on non-transitory computer readable medium and executed by one or more processors.

Aspects of the present disclosure can involve a system, which can include means for intaking sensor data associated with an arc weld from a robotic welding process, the sensor data having thermal imaging data; means for executing a machine learning model on the sensor data, the machine learning model configured to output predicted internal parameters of a weld seam of the arc weld, predicted surface parameters of the weld seam of the arc weld, and a predicted quality of the arc weld associated with the predicted internal parameters and the surface parameters; and means for modifying parameters of the robotic welding process based on the output predicted quality, the output predicted internal parameters, and the predicted surface parameters of the arc weld.

Aspects of the present disclosure can involve an apparatus, which can include a processor configured to execute a method or instructions involving intaking sensor data associated with an arc weld from a robotic welding process, the sensor data having thermal imaging data; executing a machine learning model on the sensor data, the machine learning model configured to output predicted internal parameters of a weld seam of the arc weld, predicted surface parameters of the weld seam of the arc weld, and a predicted quality of the arc weld associated with the predicted internal parameters and the surface parameters; and modifying parameters of the robotic welding process based on the output predicted quality, the output predicted internal parameters, and the predicted surface parameters of the arc weld.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" mayinvolve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Figure 1:
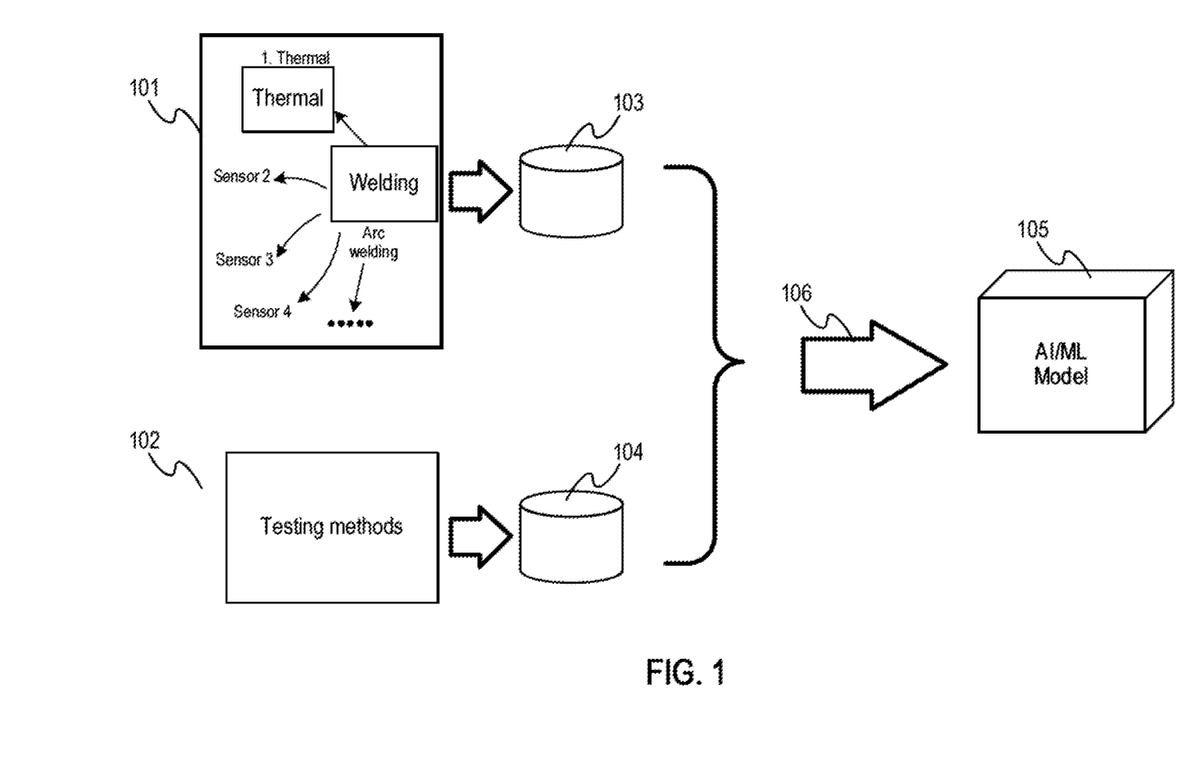
FIG. 1 describes the first step of using sensor fusion and AI/ML to obtain the initial model for welding quality prediction/judgement using welding processing data, in accordance with an example implementation.

FIG. 1 shows the detailed steps for the initial preparation of the AI/ML based model, in accordance with an example implementation. First, real-time welding process data will be collected through various sensors 101, which includes at least a thermal graphic camera. The thermal graphic camera provides a basis for general welding condition information for analysis, which includes, but is not limited to, surface geometry, heat/temperature distribution, distribution of high temperature objects, and also dynamic information regarding the changes in all these factors. The thermal graphic cameras are easy to add on to existing robotic welding setups and hardly alters existing robotic welding operations. Sensors 101 can also combine thermal graphic cameras with other sensors for enhanced data collection and analysis. Examples of sensors can include weld feed speed, welding voltage and current, high-dynamic range camera, and so on. The use of additional sensors could improve the accuracy and precision of the model prediction and also potentially saves processing time needed for the analysis. Sensors 101 can generate welding process data 103. Then, for each welding practice, the corresponding welding quality data 104 is collected using various testing methods 102 like ultrasonic testing, surface profiling and so on. Finally, welding process data 103 and welding quality data 104 will be imported into the AI/ML-based model 105 to study and build the relationship between the welding process data 103 and welding quality data 104. Process 106 refers to such process to building the initial model, as well as the training and initial validation of the model 105. As an end results of this step, model 105 now has the knowledge to predict the corresponding welding quality 104 based on different welding process daa 103.

Figure 2:
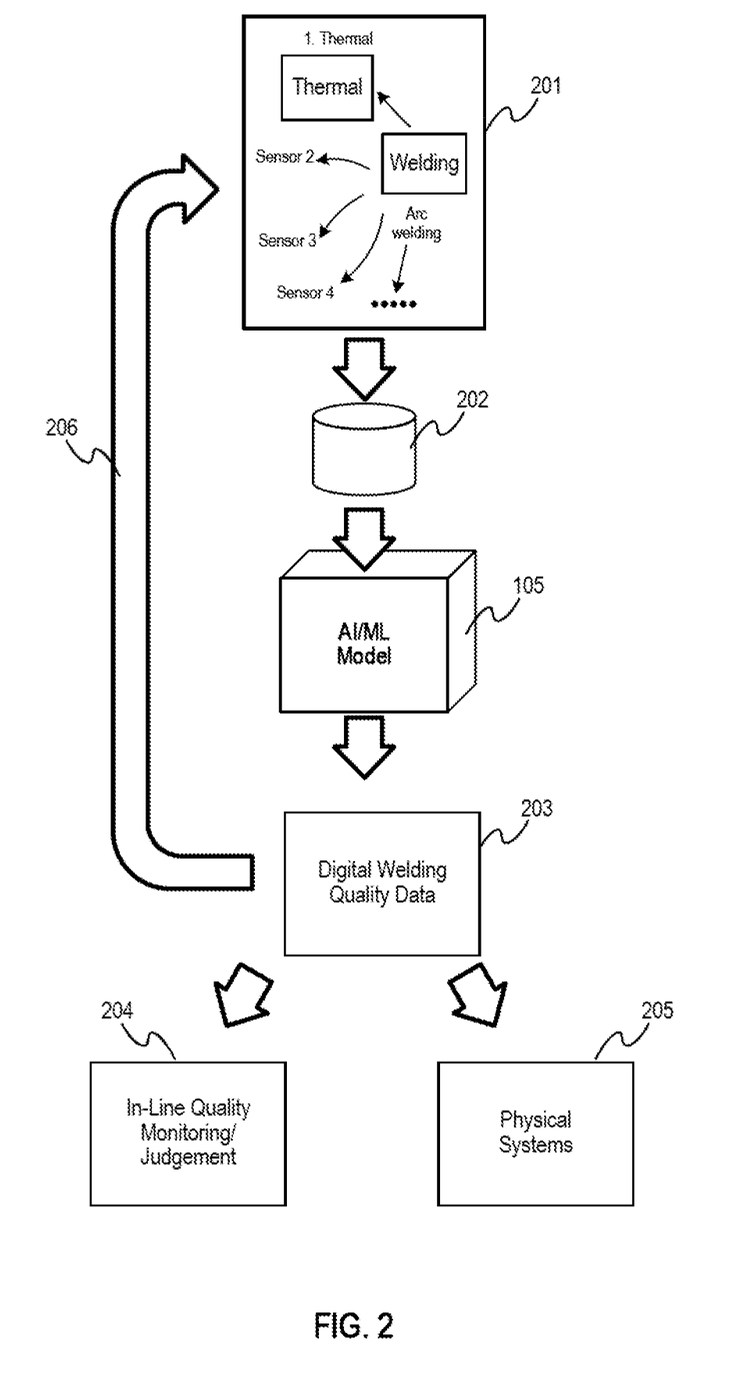
FIG. 2 describes example applications of the model for the industrial welding processes, in accordance with an example implementation.

FIG. 2 illustrates the detailed procedure of implementing the initial AI/ML model 105 in industrial production, in accordance with an example implementation. First at 201, welding process data is collected during the actual production and stored at 202. The welding process data stored at 202 is used as input for the AI/ML model 105, which generates the corresponding digitized welding quality data 203. Digitized welding quality data 203 can be used for in-line quality monitoring/judgement 204. Further, digitized welding quality data 203 can be used for or be incorporated into other Industrial Internet of Things (IIoT), Industrial 4.0 or smart manufacturing systems 205. Process 206 describes the usage of real-time digital quality data from the model to improve the on-going welding condition/process without stopping the actual welding process (or only with a slight delay).

Figure 3:
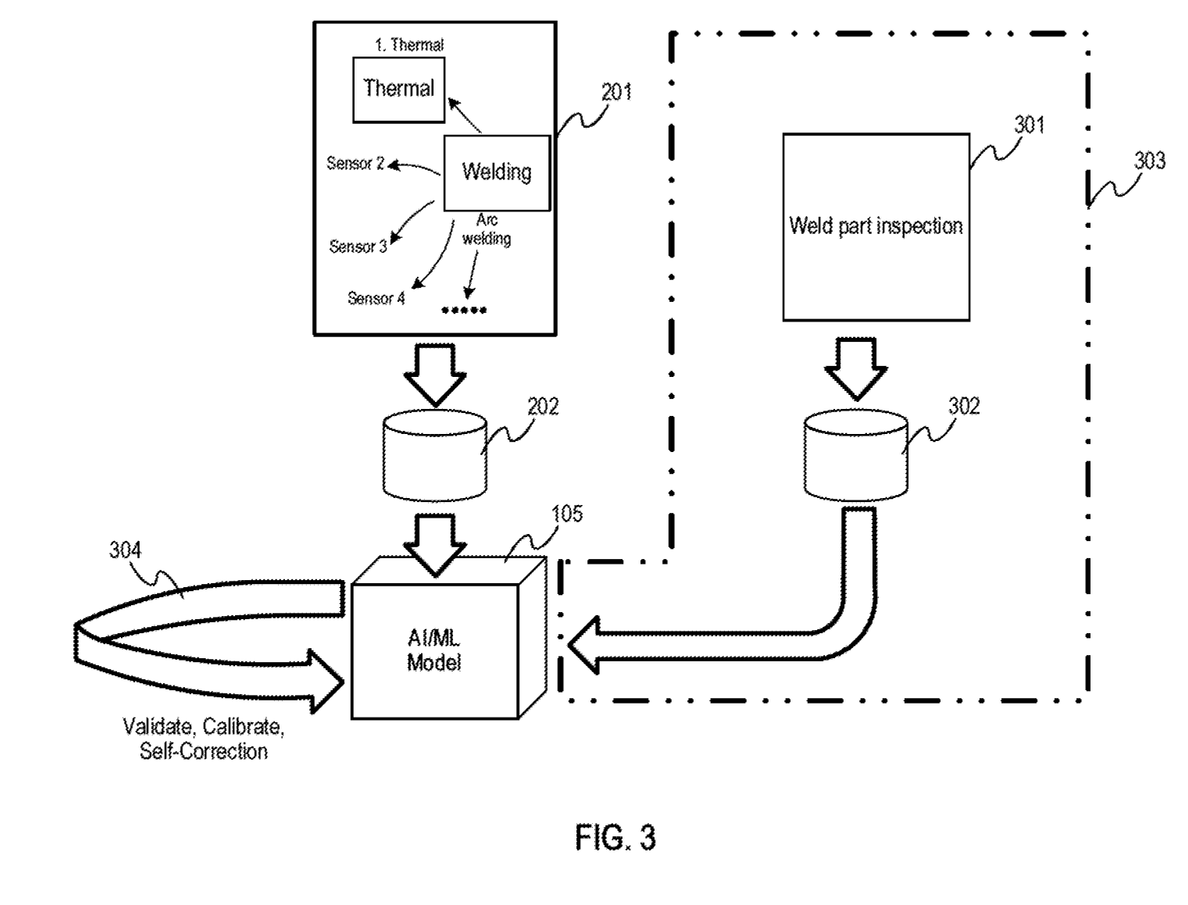
FIG. 3 describes the continuous improvement process for the AI/ML based model after initial deployment, in accordance with an example implementation.

FIG. 3 describes the additional feature of the AI/ML-based model to continuously improve even after initial deployment and during production, in accordance with an example implementation. To improve the model prediction, additional work in the post-welding process 303 is needed. Post-welding process 303 performs weld part inspection 301 and collects the corresponding welding quality data 302. Similar to the work flow shown in FIG. 1, the model (105) can now use welding process data 202 and welding quality data 302 during actual production to implement an improvement process 304 that validates, calibrates, corrects, and improves the prediction results for a specific welding production process.

Figure 4:
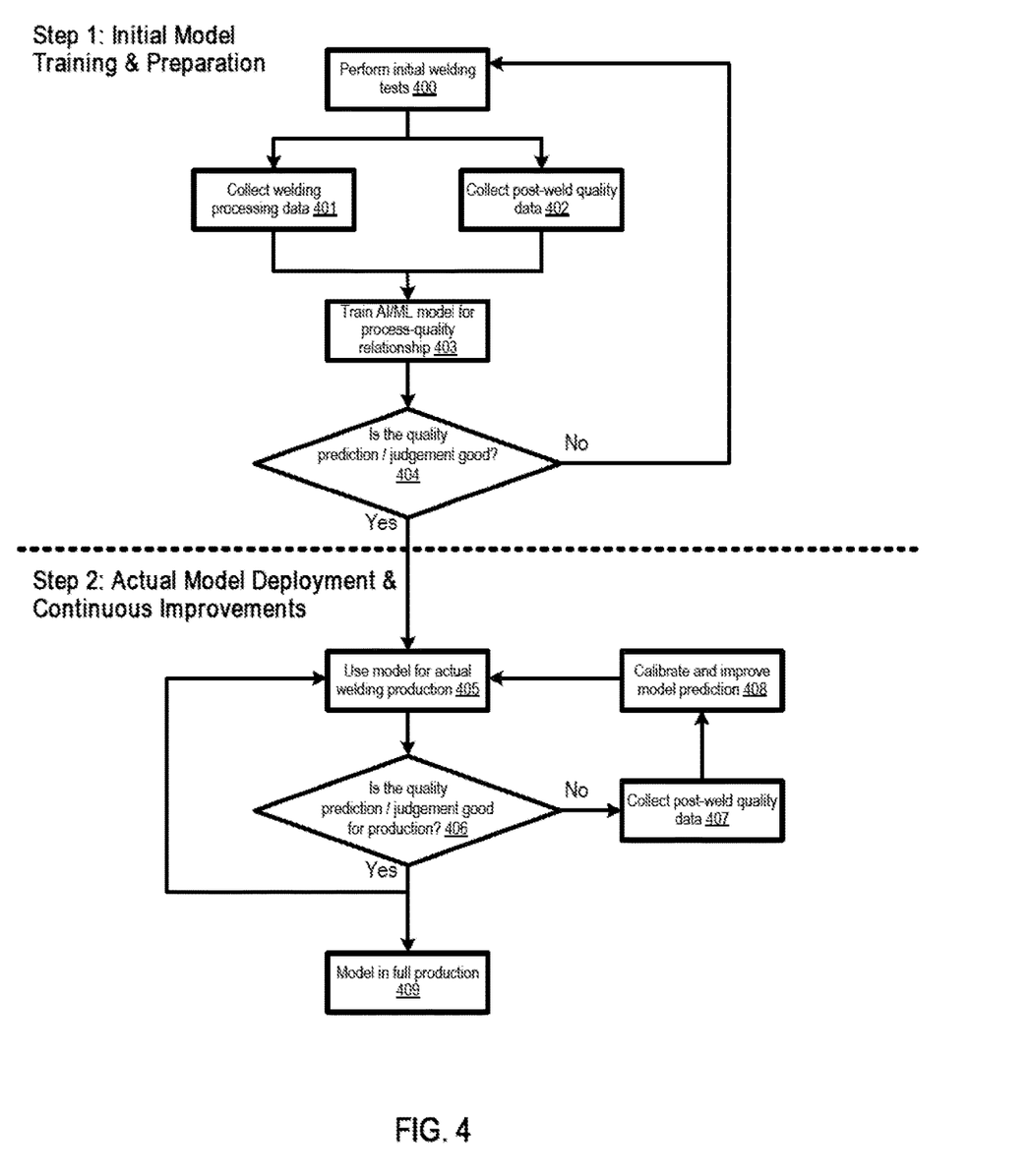
FIG. 4 describes the general workflow for the system including the initial setup and preparation of the model (step 1), as well as the actual application and available additional features (step 2), in accordance with an example implementation.

FIG. 4 shows the entire work flow of both step 1 (initial testing, model setup and training) as well as step 2 (deployment for industrial production) including the available features (weld part inspection 301, welding quality data 302, improvement process 304) to further improve the model analysis outputs, in accordance with an example implementation. In Step 2, if the output from the initial model is not satisfactory, users can choose to perform weld part inspection 301, collect welding quality data 302 and execute an improvement process 304 to calibrate and enhance model predictions. Further, users can use the model predictions through process 206 to provide real-time (or slightly delayed) adjustments in welding processing control to improve welding conditions for better quality. Step 1 and Step 2 are very different in that Step 1 is focusing on process 106 that builds the model 105, whereas Step 2 addresses the actual application after the system is deployed in production. Step 2 contains two optional features to (a) further improve model 105 outputs through weld part inspection 301, welding quality data 302, and improvement process 304, and also (b) process 206 to use real-time model output to improve the on-going welding process without interruptions of production.

As part of Step 1, at 400, the process performs initial welding tests. From the initial welding tests 400, the welding process data can be collected at 401 via sensors 101 generating the welding process data 103, and the post-weld quality data can be collected at 402 via testing methods 102 generating post-weld quality data 104. The welding process data 103 and the post-weld quality data 402 is used at 403 to train the AI/ML model for learning the process-quality relationship to generate model 105 via process 106.

At 404, a determination is made as to whether the quality prediction/judgment is sufficient. If not (No), then the welding tests 400 are executed again to retrain the model. Otherwise (Yes), then the model can be deployed and improved upon at Step 2.

For Step 2, the model is utilized for actual welding production at 405 as shown in the process of FIG. 2 at 201 to 205. At 406, a determination is made as to whether the quality prediction/judgment from the model is good for production. Such a determination can be made based on whether the output prediction is within a threshold margin (e.g., set as desired) as the actual post-weld quality data. If not (No), then the flow proceeds to collect post-weld quality data at 407 through executing weld part inspection 301 to generate and store the post-weld quality data at 302. The flow proceeds to then calibrate and improve the model prediction at 408 based on the improvement process 304. Otherwise (yes), the flow executes process 206 and returns to utilizing the model for actual welding production at 405. The model can then be used in full production as shown at 409.

There are several advantages of the example implementations described herein. Firstly, the proposed method does not require additional manufacturing process to be added to the existing production line. Secondly, the proposed method requires only minimal modification to the existing welding apparatus, and some of the data already being collected during typical industrial practices can also be used.

In addition, by using advanced data analytics and modeling, the proposed method can provide welding quality judgement with high accuracy and precision, covering a wide range of defects during welding based on types of sensor data used. Quality prediction/judgement from AI/ML based models can be continuously improved even after deployment when reliable post weld quality data can be acquired, which further improves its accuracy for specific and specialized applications. Example implementations can also provide real-time (or slightly delayed) welding quality prediction/judgement for improved control/processing of the on-going welding process without interruption of production. All quality information/judgement generated through the proposed method is readily digitized and can be easily integrated for future IIoT (Industrial Internet of Things) or Industrial 4.0 applications.

Figure 5:
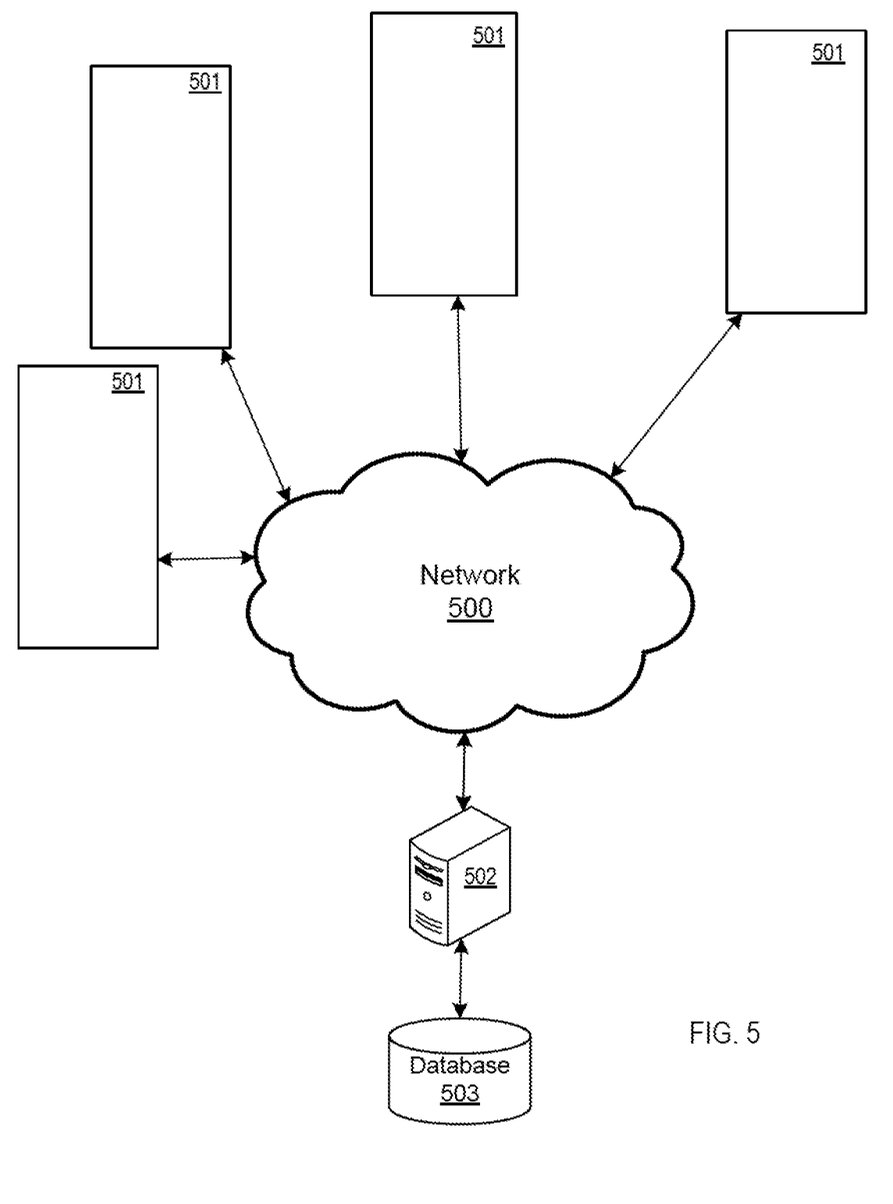
FIG. 5 illustrates a system involving a plurality of robotic welding systems networked to a management apparatus, in accordance with an example implementation.

FIG. 5 illustrates a system involving a plurality of robotic welding systems networked to a management apparatus, in accordance with an example implementation. One or more robotic welding systems 501 integrated with various sensors are communicatively coupled to a network 500 (e.g., local area network (LAN), wide area network (WAN)) through the corresponding network interface of the sensor system installed in the robotic welding systems 501, which is connected to a management apparatus 502. Each of the robotic welding systems 501 can be configured to execute a robotic welding process to conduct arc welds in accordance with desired implementation. The management apparatus 502 manages a database 503, which contains historical data collected from the sensor systems from each of the robotic welding systems 501. In alternate example implementations, the data from the sensor systems of the robotic welding systems 501 can be stored to a central repository or central database such as proprietary databases that intake data from the robotic welding systems 501, or systems such as enterprise resource planning systems, and the management apparatus 502 can access or retrieve the data from the central repository or central database. The sensor systems of the robotic welding systems 501 can include any type of sensors to facilitate the desired implementation as described herein.

Management apparatus 502 can execute the AI/machine learning model 105 as described herein to monitor such robotic welding processes. To monitor the robotic welding processes, the management apparatus 502 can be configured to intake sensor data associated with an arc weld from a robotic welding process. Such sensor data can involve thermal imaging data, and/or any other additional welding related sensing data for sensor fusion and enhanced prediction. In example implementations, any historical sensor data that can be used to mark some locations as having a higher risk can be used to facilitate the desired implementation.

Management apparatus 502 executes the AI/machine learning model 105 as described herein on the sensor data to output digitized welding quality data 203 as described herein. In an example implementation, digitized welding quality data 203 can include predicted internal parameters of a weld seam of the arc weld, predicted surface parameters of the weld seam of the arc weld, and a predicted quality of the arc weld associated with the predicted internal parameters and the surface parameters.

Management apparatus 502 can train the AI/machine learning model from the database 503 to learn associations between historical parameters of the robotic welding process and historical internal surface parameters, historical surface parameters of the arc weld, and historical output quality of the arc weld, as generated from the historical parameters of the robotic welding process and as stored on the database 503. Further details are described below.

Predicted internal parameters can involve predicted porosity and predicted internal cracks of the weld seams of an arc weld as output by the machine learning model determined from the thermal imaging data. To train the machine learning model to predict the porosity and internal cracks, the database 503 can store and manage historical thermal imaging data of arc welds as well as the resulting historical porosity and historical internal cracks as measured from the corresponding weld seam of the arc weld, wherein the machine learning model is trained by learning the association between the historical thermal imaging data of the arc weld and the resulting porosity and internal cracks of the corresponding arc weld. To supplement the training, thermal history may also be a part of the sensor data and the thermal imaging data, which can indicate any incidents of overheating or under heating by the robotic welding process on the corresponding arc weld. Machine learning model can also be trained to associate thermal history and the detected incidents of overheat or underheat with the resulting porosity and internal cracks. Thermal history can also include any data in accordance with the desired implementation that is relevant for flagging potential bad joints. For example, heat above a threshold in the thermal history may be linked to internal porosity in the particular location. Other data can also be used, and the present disclosure is not particularly limited to the above implementation.

Predicted surface parameters can involve a width of the weld seam, a height of the weld seam, and a fill of the weld seam (e.g., a three-dimensional surface profile/geometry of the weld seam). The machine learning model can be trained to learn to predict the width, height, and fill of the weld seam from the sensor data based on historical measurements of the width, height, and fill of historical weld seams and corresponding historical sensor data corresponding to the weld seams. Examples of relevant sensor data that can be used to predict the width, height, and fill of the weld seam can involve one or more of optical camera data, laser profile of the weld seam, or any data acquisition systems in accordance with the desired implementation. Such data acquisition systems can provide measurements that can include, but are not limited to, voltage, current, feeding speed, movement speed of weld head, path of weld head, and so on.

As described herein, the predicted quality of the arc weld can be derived by the model from the predicted surface parameters and the predicted internal parameters. The machine learning model can be trained to learn the predicted quality of the arc weld from association of the historical quality measurements of historical arc welds with the historical surface parameters and the historical internal parameters corresponding to the historical arc welds. Such machine learning models can also be fed measured parameters of the weld seam of the arc weld, measured surface parameters of the weld seam of the arc weld, and measured quality of the arc weld associated with the predicted internal parameters and the surface parameters to continually retrain through the flow of FIG. 3.

In addition, management apparatus 502 can control the robotic welding process by modifying the parameters of the robotic welding process of a given arc weld, based on the predicted quality, predicted internal parameters, and predicted surface parameters. Such parameters can include, but are not limited to, one or more of voltage, current, feeding speed, movement speed, and weld path. Such parameters can also be output by the machine learning model by training the machine learning model to learn associations between the historical parameters of the robotic welding process and corresponding historical arc welds having a quality meeting desired threshold or parameters. Other parameters of the robotic welding process can also be used, and the present disclosure is not limited thereto. Such parameters can include part setup/geometries (e.g., gap between parts, amount of overlap in lap joints, thickness of parts, etc.), angle of the gun, setup geometry between the gun and the part, distance between the gun and the part, filler material type/specs, and so on.

In example implementations, the robotic welding systems 501 may be deployed live and executing the robotic welding processes on parts in production. Accordingly, management apparatus 502 can associate the parts in production with the arc weld being evaluated by the machine learning model to reject or accept parts in production based on the predicted quality. For example, parts in production associated with the arc weld having a predicted quality being bellowed a desired threshold can be rejected by the management apparatus 502, wherein the management apparatus 502 transmits instructions to the robotic welding 501 to flag the part as rejected. Similarly, if the predicted quality meets the desired threshold, the management apparatus 502 can transmit instructions to the robotic welding system 501 to flag the associated part as accepted. Management apparatus 502 can also store in the database 503 the predicted internal parameters of the weld seam of the arc weld, the predicted surface parameters of the weld seam of the arc weld, and the predicted quality of the arc weld associated with the predicted internal parameters and the surface parameters with associated parts in production involving the arc weld to assist as a production management system.

Figure 6:
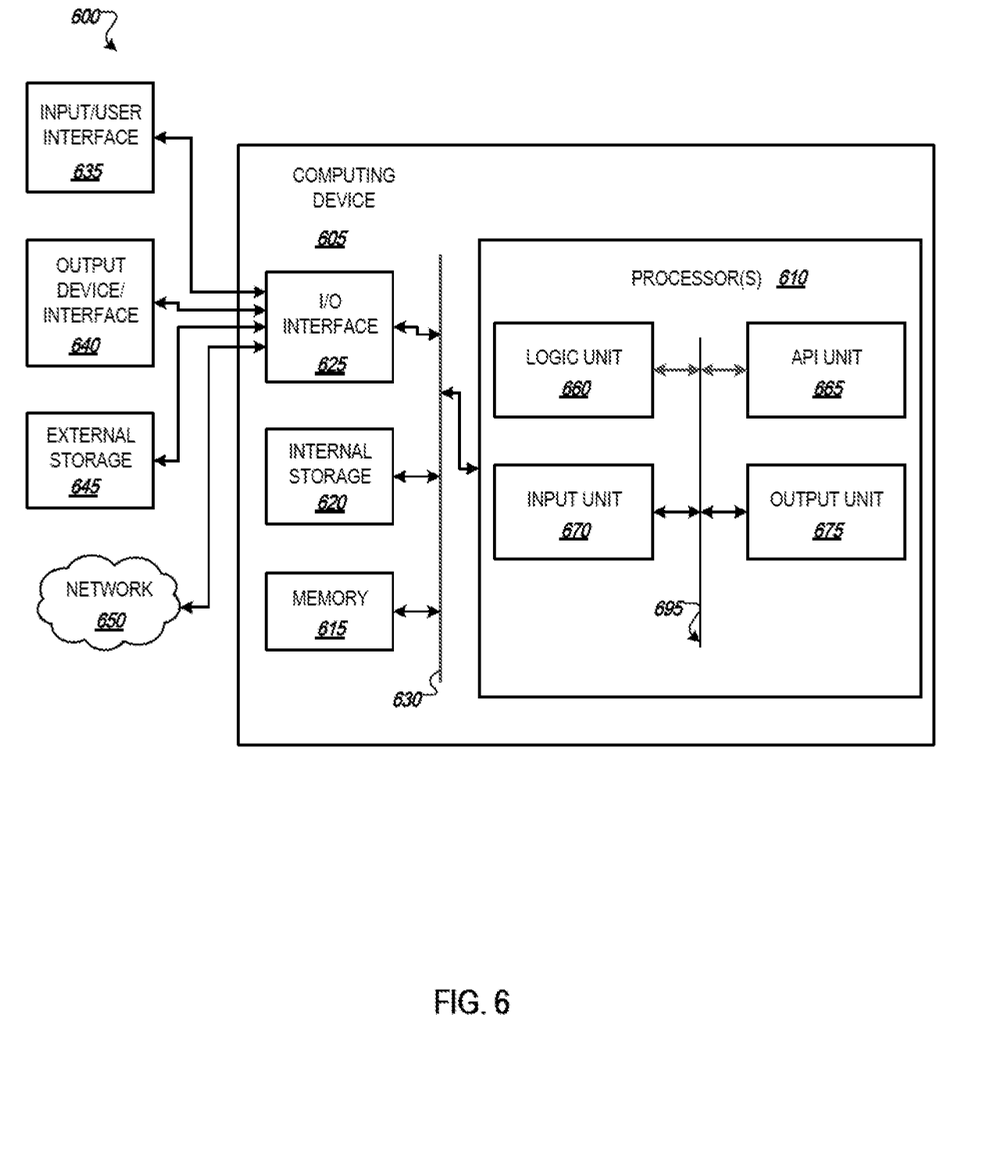
FIG. 6 illustrates an example computing environment with an example computer device suitable for use in some example implementations.

FIG. 6 illustrates an example computing environment with an example computer device suitable for use in some example implementations, such as a management apparatus 502 as illustrated in FIG. 5. Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
   utilizing at least one or more thermal graphic cameras to intake sensor data associated with an arc weld from a robotic welding process, the sensor data comprising thermal imaging data comprising surface geometry, heat/temperature distribution, distribution of high temperature objects, and dynamic change associated with the surface geometry, heat/temperature distribution, and the distribution of the high temperature objects as obtained from the at least one or more thermal graphic cameras;
   executing a machine learning model on the sensor data, the machine learning model configured to intake the sensor data and the thermal imaging data as welding process data to output predicted internal parameters of a weld seam of the arc weld, predicted surface parameters of the weld seam of the arc weld, and a predicted quality of the arc weld associated with the predicted internal parameters and the predicted surface parameters; and
   controlling the robotic welding process of the arc weld in real-time through modifying parameters of the robotic welding process of the arc weld in-real time based on the output predicted quality, the output predicted internal parameters, and the predicted surface parameters.

2. The method of claim 1, further comprising training the machine learning model, the training of the machine learning model comprising training the machine learning model to learn associations between historical parameters of the robotic welding process and historical internal surface parameters, historical surface parameters of the arc weld, and historical output quality of the arc weld, as generated from the historical parameters of the robotic welding process.

3. The method of claim 1, further comprising, for parts in production associated with the arc weld having the predicted quality below a threshold, rejecting the parts in production, and
   for the parts in production associated with the arc weld having the predicted quality meeting the threshold, accepting the parts in production.

4. The method of claim 1, further comprising storing the predicted internal parameters of the weld seam of the arc weld, the predicted surface parameters of the weld seam of the arc weld, and the predicted quality of the arc weld associated with the predicted internal parameters and the surface parameters with associated parts in production involving the arc weld.

5. The method of claim 1, further comprising feeding measured parameters of the weld seam of the arc weld, measured surface parameters of the weld seam of the arc weld, and measured quality of the arc weld associated with the predicted internal parameters and the surface parameters back to the machine learning model to continually retrain.

6. The method of claim 1, wherein the predicted internal parameters comprises predicted porosity and predicted internal cracks determined from the thermal imaging data.

7. The method of claim 1, wherein the predicted surface parameters comprises a width of the weld seam, a height of the weld seam, and a three-dimensional surface profile of the weld seam.

8. The method of claim 1, wherein the sensor data further comprises thermal history, wherein the predicted internal parameters are derived from overheating or under heating as indicated by the thermal history.

9. The method of claim 1, wherein the sensor data comprises one or more of optical camera data, laser profile of the weld seam, or data acquisition systems.

10. The method of claim 1, wherein the parameters of the robotic welding process comprises one or more of voltage, current, feeding speed, movement speed, and weld path.

11. A non-transitory computer readable medium, storing instructions for executing a process, the instructions comprising:
    utilizing at least one or more thermal graphic cameras to intake sensor data associated with an arc weld from a robotic welding process, the sensor data comprising thermal imaging data comprising surface geometry, heat/temperature distribution, distribution of high temperature objects, and dynamic change associated with the surface geometry, heat/temperature distribution, and the distribution of the high temperature objects as obtained from the at least one or more thermal graphic cameras;
    executing a machine learning model on the sensor data, the machine learning model configured to intake the sensor data and the thermal imaging data as welding process data to output predicted internal parameters of a weld seam of the arc weld, predicted surface parameters of the weld seam of the arc weld, and a predicted quality of the arc weld associated with the predicted internal parameters and the predicted surface parameters; and
    controlling the robotic welding process of the arc weld in real-time through modifying parameters of the robotic welding process of the arc weld in-real time based on the output predicted quality, the output predicted internal parameters, and the predicted surface parameters.

12. The non-transitory computer readable medium of claim 11, further comprising training the machine learning model, the training of the machine learning model comprising training the machine learning model to learn associations between historical parameters of the robotic welding process and historical internal surface parameters, historical surface parameters of the arc weld, and historical output quality of the arc weld, as generated from the historical parameters of the robotic welding process.

13. The non-transitory computer readable medium of claim 11, further comprising, for parts in production associated with the arc weld having the predicted quality below a threshold, rejecting the parts in production, and
    for the parts in production associated with the arc weld having the predicted quality meeting the threshold, accepting the parts in production.

14. The non-transitory computer readable medium of claim 11, further comprising storing the predicted internal parameters of the weld seam of the arc weld, the predicted surface parameters of the weld seam of the arc weld, and the predicted quality of the arc weld associated with the predicted internal parameters and the surface parameters with associated parts in production involving the arc weld.

15. The non-transitory computer readable medium of claim 11, further comprising feeding measured parameters of the weld seam of the arc weld, measured surface parameters of the weld seam of the arc weld, and measured quality of the arc weld associated with the predicted internal parameters and the surface parameters back to the machine learning model to continually retrain.

16. The non-transitory computer readable medium of claim 11, wherein the predicted internal parameters comprises predicted porosity and predicted internal cracks determined from the thermal imaging data.

17. The non-transitory computer readable medium of claim 11, wherein the predicted surface parameters comprises a width of the weld seam, a height of the weld seam, and a three-dimensional surface profile of the weld seam.

18. The non-transitory computer readable medium of claim 11, wherein the sensor data further comprises thermal history, wherein the predicted internal parameters are derived from overheating or under heating as indicated by the thermal history.

19. The non-transitory computer readable medium of claim 11, wherein the sensor data comprises one or more of optical camera data, laser profile of the weld seam, or data acquisition systems.

20. The non-transitory computer readable medium of claim 11, wherein the parameters of the robotic welding process comprises one or more of voltage, current, feeding speed, movement speed, and weld path.

\* \* \* \* \*